United States Patent [19]

Arya et al.

[11] 4,063,962

[45] Dec. 20, 1977

[54] METHOD AND APPARATUS FOR CLEANING NUCLEAR FUEL ELEMENTS

[75] Inventors: Satya Prakash Arya, San Diego; Walter Woodrow Godsin, Oceanside, both of Calif.

[73] Assignee: General Atomic Company, San Diego, Calif.

[21] Appl. No.: 674,376

[22] Filed: Apr. 7, 1976

[51] Int. Cl.$^2$ .............................................. B08B 9/04
[52] U.S. Cl. .................................... 134/8; 15/21 D; 15/308; 134/18; 134/23; 134/39; 264/.5
[58] Field of Search ................. 134/8, 18, 22 R, 22 C, 134/23, 39, 2; 15/21 D, 97 R, 104.1 R, 308; 264/.5

[56] References Cited

U.S. PATENT DOCUMENTS

| | | | |
|---|---|---|---|
| 3,291,870 | 12/1966 | Allison | 264/.5 |
| 3,496,017 | 2/1970 | Weed | 134/22 R |
| 3,666,425 | 5/1972 | Wurm et al. | 134/2 |

Primary Examiner—Robert L. Lindsay, Jr.
Assistant Examiner—George C. Yeung
Attorney, Agent, or Firm—Fitch, Even, Tabin & Luedeka

[57] ABSTRACT

In a method and apparatus for cleaning nuclear fuel elements to remove carbonized pitch residue and the like, the cleaning operation preferably being conducted within an enclosure to permit containment of the removed residue, each fuel element being introduced into the enclosure through an airlock, the end surfaces and lateral surfaces of the fuel element being cleaned and one or more longitudinal passages within the fuel element being cleaned by means of a probe unit for initially determining the configuration and position of the longitudinal passages and causing cleaning elements to be aligned with the respective longitudinal passages and extended therethrough, the flow resistance of those longitudinal passages designed for gas flow being monitored by a gauging unit, clean fuel elements being removed from the enclosure through another air-lock.

13 Claims, 5 Drawing Figures

METHOD AND APPARATUS FOR CLEANING NUCLEAR FUEL ELEMENTS

BACKGROUND OF THE INVENTION

The present invention relates to a method and apparatus for cleaning nuclear fuel elements and more particularly to such a method and apparatus for cleaning both external and internal surfaces of the fuel elements forming longitudinal passages therethrough, the method and apparatus being capable of accommodating various types of fuel elements having different arrangements of longitudinal passages extending therethrough.

In the construction and assembly of nuclear reactors, large numbers of fuel elements are employed to form the reactor cores. Each fuel element typically includes an elongated fuel block of hexagonal cross-section with a number of longitudinal passages formed in the block. These passages may include fuel passages for receiving stacks of fuel rods, the fuel passages then being closed during final assembly of the fuel elements. Additional passages within the elements include control rod passages for permitting the insertion of control rods adjacent the fuel rod stacks to permit regulation over the rate of nuclear activity in the fuel elements assembled into a reactor core. The fuel element may also be typically formed with a center hole as well as dowel pins and dowel holes arranged upon opposite end surfaces of the fuel element. The dowel pins and dowel holes insure proper alignment between fuel elements arranged within a reactor core.

In addition, the present invention particularly contemplates the cleaning of nuclear fuel elements adapted for use in high temperature gas reactors. Within such reactors, a gas such as helium forms the heat transfer or coolant medium and is circulated through longitudinal gas flow passages within the various fuel elements. The coolant gas is circulated through the assembled fuel elements within a reactor core by high speed impellers and it is necessary to insure that the gas flow passages within the fuel elements are free from foreign material which might otherwise interfere with the coolant gas circulation system. In particular, such foreign material may tend to impinge upon and damage the impellers or to cause an undesirable deposite or buildup of the material on the impellers.

During preparation of the individual fuel elements, they are first loaded with stacks of fuel rods as described above and then subjected to high temperatures within a in-block curing process. The curing process is particularly intended to cure or harden nuclear fuel containing pitch forming the nuclear fuel rods. However, upon being subjected to the high temperature environment of the process, some of the pitch tends to escape, resulting in the deposition of a light, flaky carbonized pitch residue on all surfaces of the fuel element.

As indicated above, it is necessary to completely remove the pitch residue from all surfaces of the fuel element before the element is further treated and installed within a reactor core. In addition, it is necessary to insure that the various surface dimensions for the fuel elements are accurately restored after the cleaning operation in order to permit a proper intermeshing fit of the fuel elements within the reactor core.

Accordingly, cleaning of the pitch residue from fuel elements has been a particular problem in the past. There has thus been found to remain a need for a method and apparatus for cleaning such fuel elements to assure the complete removal of foreign material such as pitch residue from the fuel element surfaces, particularly those surfaces which form part of the coolant gas circulation system for a reactor core.

Cleaning of the fuel elements is further complicated because of the nuclear fuel contained within the fuel elements during the cleaning operation. It is therefore necessary to conduct the cleaning operation remote from operating personnel, making it difficult to assure that all surfaces of the fuel elements are adequately cleaned.

Further, it is common to employ a single manufacturing facility for the construction and assembly of fuel elements of different sizes and configurations in order to meet the requirements of different reactor applications. It is therefore also contemplated that a method and apparatus for cleaning nuclear fuel elements be adaptable for cleaning various sizes and configurations of fuel elements.

SUMMARY OF THE INVENTION

Accordingly, it is an object of the present invention to provide a method and/or apparatus for cleaning nuclear fuel elements, the method and apparatus being capable of overcoming one or more problems of the type set forth above.

It is a further object of the invention to provide such a method and/or apparatus wherein opposed end surfaces of a fuel element are cleaned by means such as rotating brushes, for example, the configuration of the particular fuel elements being determined by suitable probe means operable to align cleaning elements with respective longitudinal passages in the fuel element.

It is an even further object of the invention to provide such a method and/or apparatus for cleaning nuclear fuel elements of a type adapted for use in high temperature gas reactors and having longitudinal gas flow passages therethrough, gas flow resistance of the longitudinal passages being monitored by a suitable gauge means in order to determine satisfactory completion of the cleaning operation.

It is yet another object of the invention to provide such a method and/or apparatus further including an enclosure for containing the entire cleaning operation with suitable means being provided for moving the fuel elements between various stages where the respective cleaning operations are preformed.

It is also another object of the invention to provide such a method and/or apparatus wherein the various steps of the cleaning process are regulated under control means capable of programmed operation.

Additional objects and advantages of the invention are made apparent in the following description having reference to the accompanying drawings.

DESCRIPTION OF THE PREFERRED EMBODIMENTS

Figure 1:
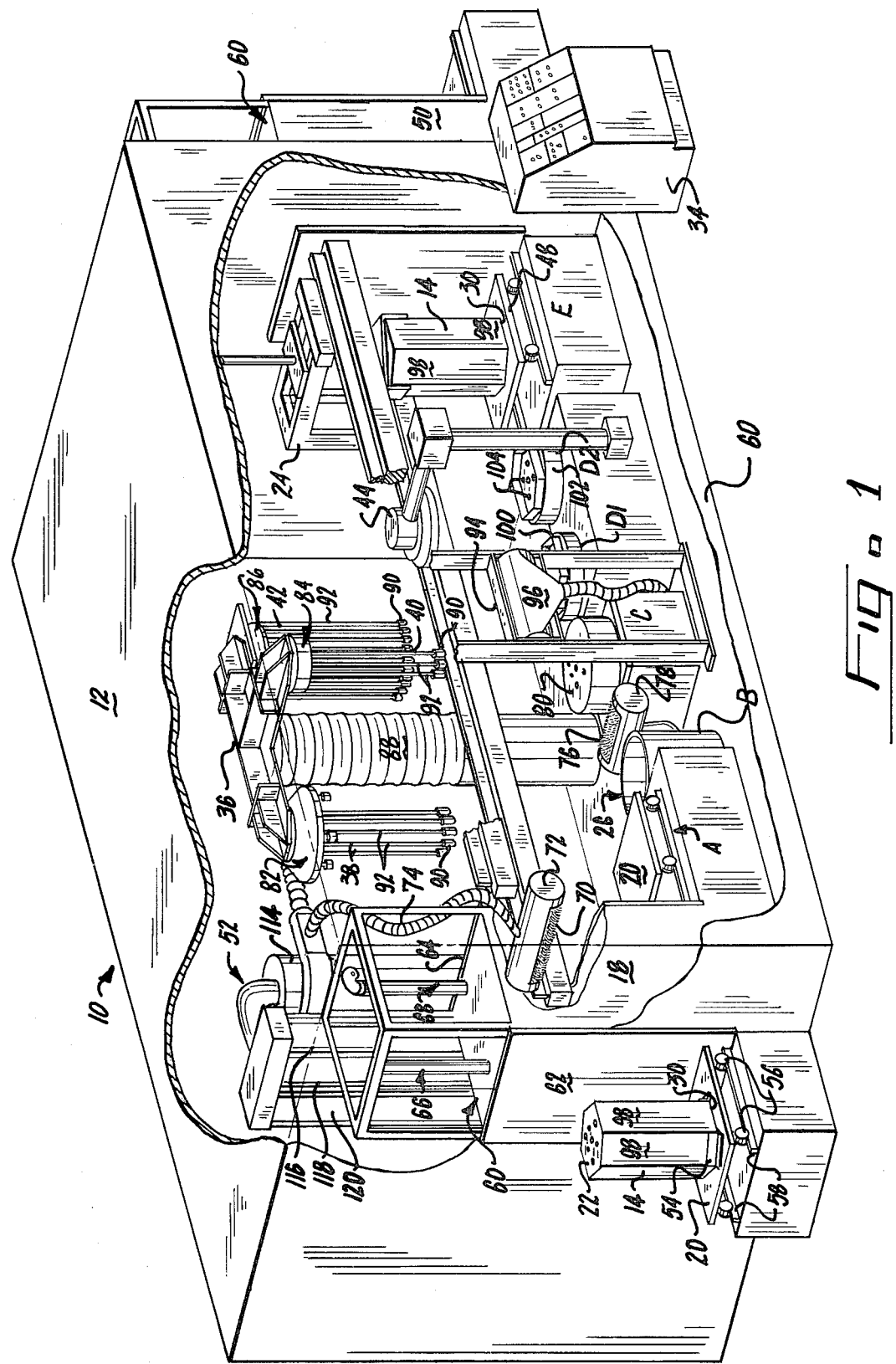
FIG. 1 is an isometric view of a nuclear fuel element cleaning system constructed in accordance with the present invention as well as providing means for performing the method of the present invention.
Figure 2:
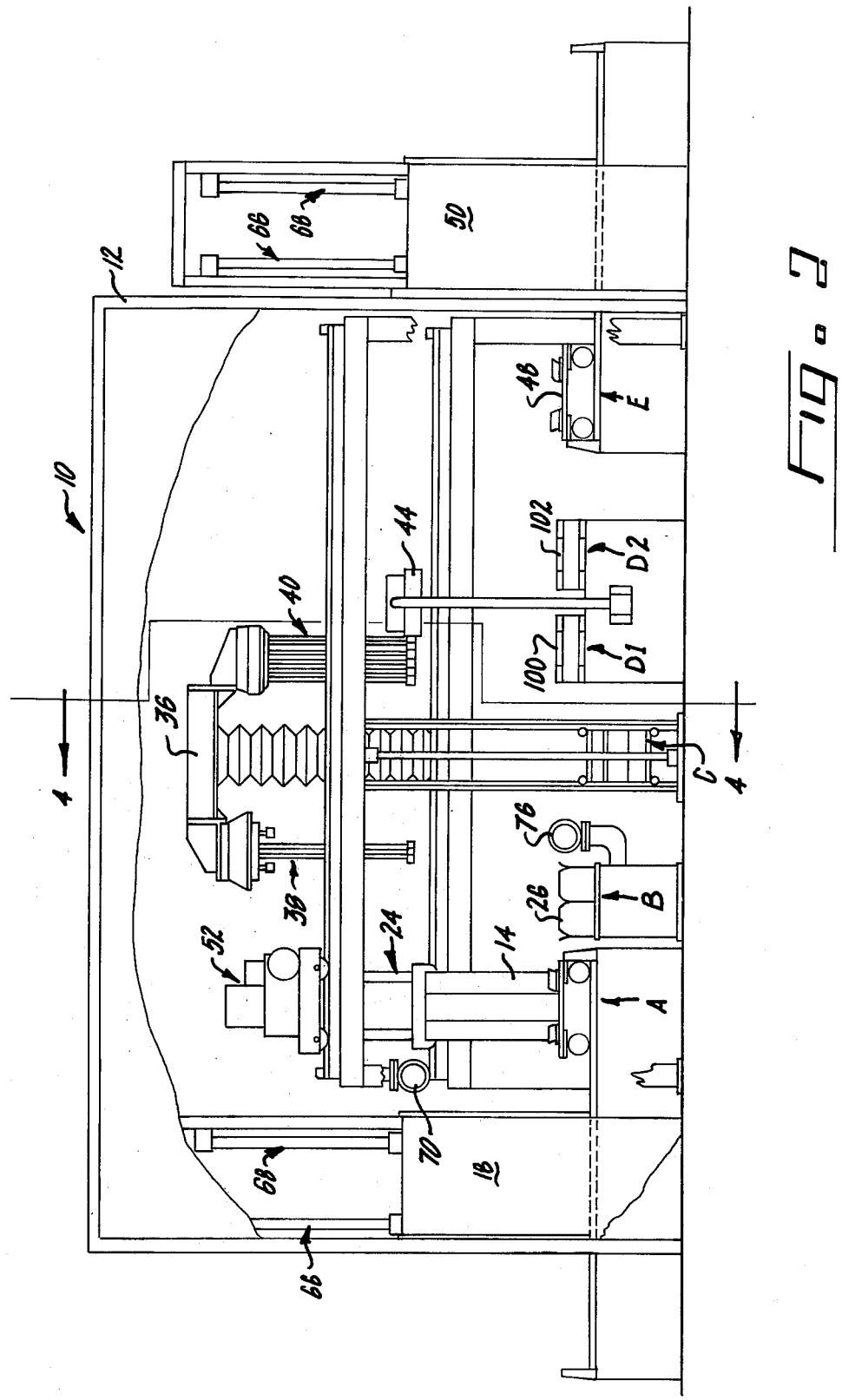
FIG. 2 is a side view in elevation, with parts being broken away for clarity, of the fuel element cleaning system of FIG. 1.
Figure 3:
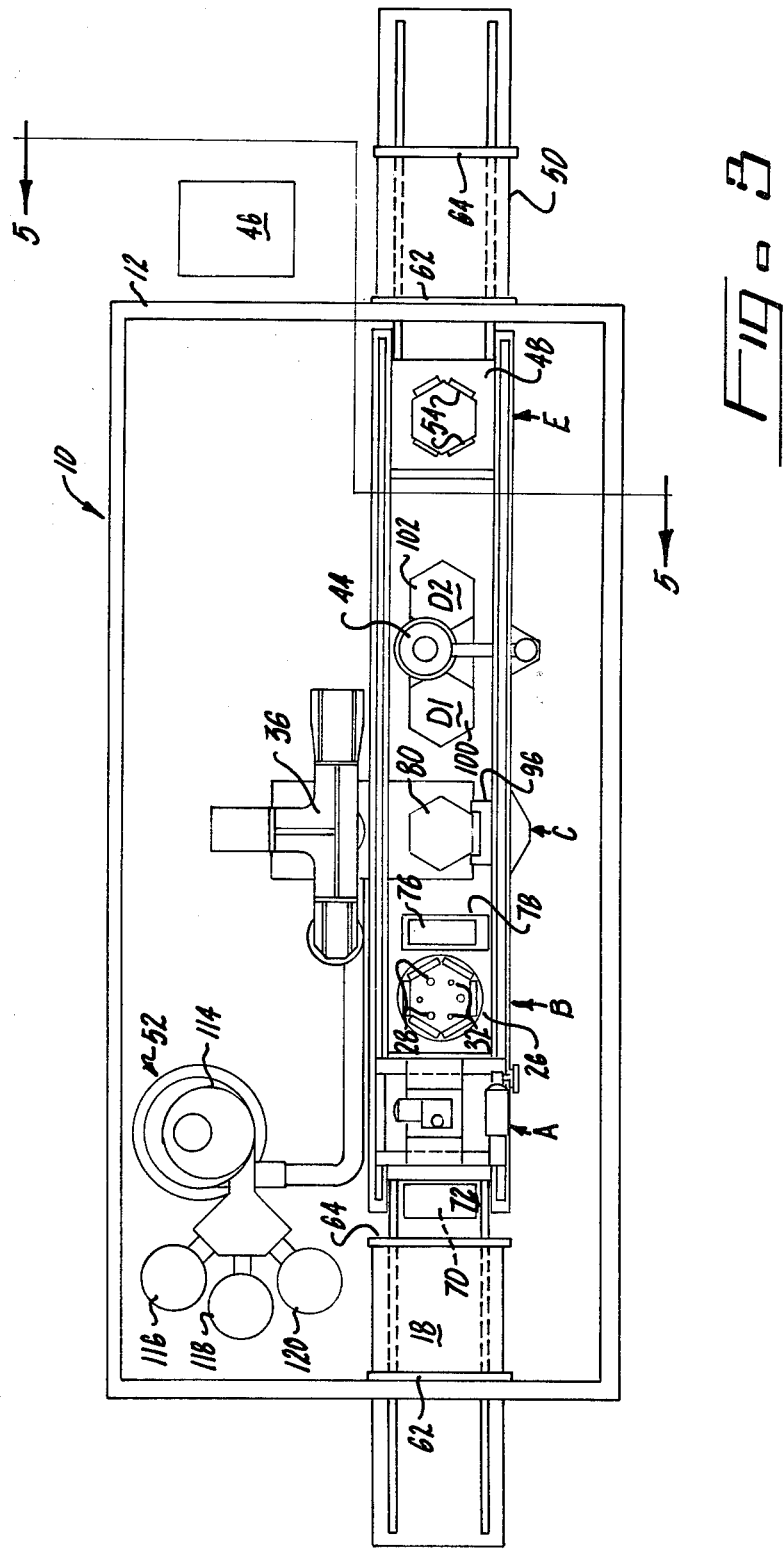
FIG. 3 is a plan view of the fuel element cleaning system.
Figure 4:
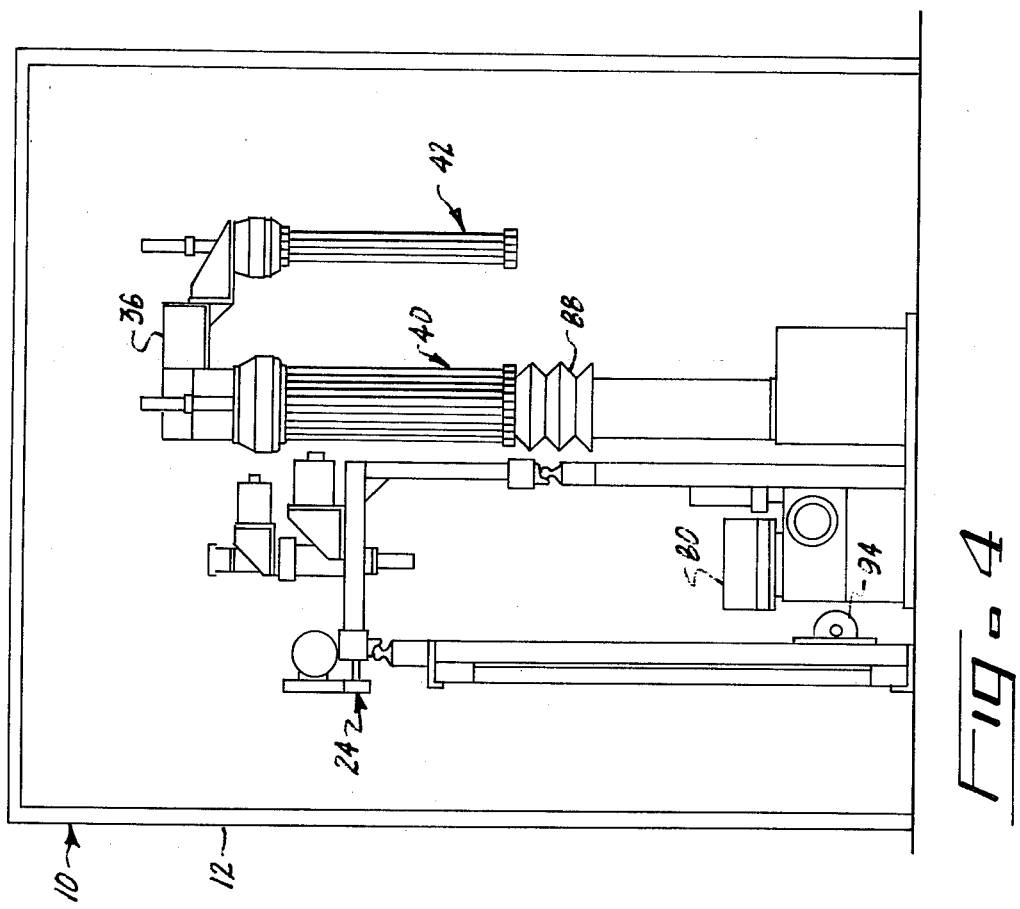
FIG. 4 is a view taken along section lines IV—IV of FIG. 2 in order to more clearly illustrate apparatus associated with one station of the system adapted to clean a variety of different fuel element configurations.

Apparatus constructed in accordance with the present invention while also providing exemplary means for performing the method of the present invention is illustrated in the drawings, the combined apparatus being best seen by combined reference to FIGS. 1-3.

To summarize the nuclear fuel element cleaning system generally indicated in the drawings at 10 and having particular reference to FIG. 1, it may be seen that the system is arranged within a fabricated enclosure 12 permitting the containment of ash formed from pitch residue and other foreign material removed from the fuel elements. Generally, the fuel elements are introduced into the left end of the cleaning system as viewed in the drawings and are moved toward the right through a series of stations where various cleaning operations are accomplished. Cleaned fuel elements are removed from the right end of the enclosure.

Within a nuclear fuel element facility, the fuel elements are received by the present cleaning system from a conventional fuel element "cure-in-place" furnace of the type referred to above. Cleaned fuel elements exiting the present cleaning system are delivered to a fuel element inspection and packaging system in which the inspected and packaged fuel elements may be stored prior to their use during assembly of a core structure for a nuclear reactor.

Generally, each nuclear fuel element indicated at 14 is delivered to the cleaning system 10 by an overhead crane (not shown). The fuel element 14 is introduced into the enclosure through an inlet air-lock 18 upon an inlet cart 20. The inlet cart 20 carries the fuel element into an initial position within the enclosure indicated as Station A. Subsequent operating positions within the cleaning system are described below and are respectively referred to as Station B, Station C, Station D and Station E. The fourth operating location within the system referred to as Station D, includes two alternate portions referred to respectively as Stations D1 and D2.

After the fuel element 14 has been introduced into the enclosure through the air-lock 18, the upper end surface 22 of the fuel element 14 is initially cleaned as the fuel element approaches the first operating position referred to as Station A. The upper end surface 22 of the fuel element includes three projecting dowel pins which are not cleaned at this time. In addition, as the fuel element 14 approaches Station A, it is positioned by the inlet cart 20 for engagement with another conveyor extending across the interior of the enclosure 12, as embodied by the overhead traveling crane unit 24. The overhead traveling crane unit 24 serves to move the fuel element between the sequentially arranged Stations B-E.

The fuel element 14 is picked up by the crane unit 24 at Station A and transferred to Station B where it is lowered onto a hollow support housing 26 containing three rotating brushes 28 for cleaning three dowel pin holes in the lower end surface 30 of the fuel element.

A plurality of spring-loaded pins or probes 32 are also arranged within the support housing 26 in order to engage longitudinal passages extending through the fuel element and thereby determine the particular configuration or type of fuel element. Information concerning the type of fuel element is communicated through a control unit 34 for the entire cleaning system 10 for a purpose described immediately below.

As the fuel element 14 is again picked up by the overhead crane unit 24 and transferred toward the subsequent operating position at Station C, its lower surface 30 is cleaned. With the fuel element then being positioned at Station C, it is located beneath a rotatable and telescopic column 36 supporting a plurality of cleaning heads such as those indicated respectively at 38, 40 and 42. The rotatable column 36 is operated by the control unit 34 to position the appropriate cleaning head above Station C in accordance with the particular configuration of the instant fuel element as previously determined at Station B. The longitudinal passages within the fuel element are cleaned by one of the cleaning heads at Station C in a manner described below. The lateral surfaces of the fuel element are also cleaned at this location.

The fuel element is then again picked up by the crane unit 24 and transferred to one of the alternate station portions D1 or D2 depending upon the configuration of the instant fuel element. With the fuel element positioned upon one of the operating positions at Station D, for example the alternate Station D1, a movable manifold head 44 is lowered into engagement with the upper end surface 22 of the fuel element. The movable manifold 44 is a portion of a gauging unit 46 including suitable pumping and gauging components as described in greater detail below and better illustrated in FIG. 5. The gauging unit 46 serves to determine the flow resistance of selected longitudinal coolant gas passages in the fuel element in order to determine if the fuel element is suitably cleaned before being removed from the system 10.

If the fuel element is found acceptable by the gauging unit 46, it is again picked up by the crane unit 24 and transferred to a final Station E within the enclosure 12 where the fuel element is deposited upon an outlet cart 48. The outlet cart 48 conveys the cleaned fuel element through an exit airlock 50 whereupon it may be received by a suitable conveyor means (not shown) for transfer from the cleaning system. As indicated above, the cleaned fuel element is preferably delivered to a fuel element inspection and packaging system as a subsequent portion of an entire processing facility.

Within the cleaning system 10, the various cleaning components, the sensing unit at Station B, the gauging unit at Station D and the conveyors are all operated under the regulation of the control unit 34.

In addition, a pneumatic collection system 52 is in suitable communication with the various stations to collect pitch residue and other foreign material removed from surfaces of the fuel element.

The enclosure 12 for the cleaning system also includes suitable vacuum pumping means for maintaining pressure within the enclosure at a slightly reduced level, for example 0.05 psi below the environmental pressure surrounding the enclosure. In this manner, pitch residue and other foreign material escaping from any of the Stations A-E tends to be contained within the enclosure and prevented from escaping to the surrounding environment.

To describe the cleaning system 10 in greater detail, the inlet cart 20 is formed with brackets 54 for receiving the fuel element and maintaining its angular alignment for proper engagement with the crane unit 24 within the system enclosure 12. The inlet cart 20 is supported by rollers 56 which engage spaced apart rails 58 extending through the inlet air-lock 18 to the initial operating position at Station A.

The inlet air-lock 18 is formed as a pneumatically sealed box structure having inlet and outlet gates 62 and 64 which are respectively operated by overhead pneumatic cable cylinders 66 and 68. The cylinders 66 and 68 are also regulated by the control unit 34 to properly admit fuel elements into the system. The control unit 34 prevents simultaneous opening of the inlet and outlet gates 62 and 64 in order to avoid the inadvertent escape of airborne foreign material from the enclosure 12 to the environment.

The construction and operation of the outlet cart 48 and the exit air-lock 50 are substantially identical with the construction and operation for the inlet cart 20 and inlet air-lock 18. Accordingly, similar numerical labels are employed to identify the various components for the outlet cart 48 and the exit air-lock 50. It will of course be understood that the outlet cart 48 and exit air-lock 50 operate in a substantially identical manner for the purpose of removing cleaned fuel elements from the system enclosure 12.

As indicated above, the upper end surface 22 of the fuel element 14 is cleaned as the fuel element approaches the initial operating position indicated as Station A upon the inlet cart 20. For this purpose, a rotating brush 70 is mounted at a height selected for proper engagement with the upper surface of the fuel element. In addition, the rotating brush 70 is mounted within a dust collecting hood 72 which is suitably connected with the pneumatic collection system 52. Thus, pitch residue or ash and other foreign material removed from the upper end surface of the fuel element tends to be directed through the hood 72 toward the pneumatic collection system 52 through conduits such as that indicated at 74. It will be seen from the following description that similar foreign material collecting hoods are employed for subsequent cleaning operations in the other operating stations. Each of these hoods is connected with the pneumatic collection systems 52 in a similar manner. However, the various conduits for connecting the other stations with the pneumatic collection system are not shown in order to simplify and clarify the drawings.

After the upper surface of each fuel element is cleaned and arrives at Station A, it is picked up by the crane unit 24 and deposited upon the support housing 26 of Station B. As indicated above, three rotating brushes are arranged within the support housing to clean dowel holes in the lower end surface 30 of the fuel element. The support housing 26 also serves as a hood which is connected with the pneumatic collection system 52 in a similar manner as the hood 72 for the rotating brush 70.

While the fuel element is placed upon the support housing 26, one or more of the spring-loaded probes 32 may be aligned with and extend upwardly into longitudinal passages in order to determine the arrangement and configuration of longitudinal passages through the fuel element. In this manner, the configuration of each fuel element may be instantly determined. This information is transferred to the control unit 34 and subsequently employed at both of Stations C and D.

After the dowel holes in the lower end surface of the fuel element are cleaned and the configuration of the fuel element determined by the probes 32, the fuel element is again picked up by the crane unit 24 and transferred toward Station C. As the fuel element approaches Station C, it is passed above another rotating brush 76 which effectively cleans the remaining portions of the lower end surface 30 of the fuel element. The rotating brush 76 also has a hood 78 which is interconnected with the pneumatic collection system 52.

After the lower end surface of the fuel element is cleaned, it is moved to Station C and deposited upon a hollowcenter position indexing table 80 which forms an additional hood in communication with the pneumatic collection system 52. As briefly indicated above, the rotatable column 36 may be rotated by the control unit 34 in order to align any one of the cleaning heads 38, 40 or 42 with the fuel element at Station C, and the six position indexing table may be indexed into 60° increments by the control unit 34 in order to allow any one of the cleaning heads to clean 1/6th of the holes at one time. Each of the cleaning heads 38, 40 and 42 includes a different arrangement of cleaning elements indicated respectively at 82, 84 and 86. The arrangement of cleaning elements for each of the cleaning heads is selected for alignment with the longitudinal passages in the various types of fuel elements which may be received within the cleaning system.

The rotatable column 36 is mounted upon a four position indexing table including an extendable and retractable cylinder 88, also under the regulation of the control unit 34, in order to raise and lower the column 36 and the selected cleaning head. Thus, the cleaning elements may be extended through the longitudinal passages of the fuel element to completely clean the surrounding fuel element surfaces. The top dowels of the fuel element are cleaned by cleaning head 38 having three or more cup shaped rotary cleaning brushes in addition to the other cylindrical brushes. As indicated above, it is particularly important that these passage surfaces be very clean since many of the passages are employed to circulate coolant gas through the fuel element. Proper cleaning assures that foreign material is prevented from contaminating the coolant circulation system.

Preferably, the cleaning element for each of the cleaning heads 38, 40 and 42, includes a plurality of cylindrical brushes 90 which are respectively mounted upon elongated rotatable shafts 82. The diameters of the cylindrical brushes 90 are selected to be slightly larger than the nominal inside diameter of the respective longitudinal passages in the fuel element. For example, coolant flow passages in such fuel elements may have a nominal inside diameter of for example 0.828 inches or 2.10 centimeters. In one test cleaning operation such as that described for Station C, brushes three inches (or 7.6 centimeters) in length were formed with nylon bristles to have an outside diameter of approximately 0.830 inches or 2.11 centimeters. The brushes were rotated at a speed of approximately 1600 rpm while being extended downwardly through the longitudinal passages in the fuel element and again retracted.

In another similar test, brushes 2¼ inches ( or 5.7 centimeters) long were again formed with nylon bristles to have an outside diameter of approximately 0.875 inches or 2.22 centimeters. The brushes were then operated at a speed of approximately 525 rpm while being extended downwardly through the longitudinal passages in the fuel element had again retracted from them.

These exemplary conditions for operating the cleaning elements of the cleaning heads 38, 40 and 42 are set forth only for purposes of example within the present invention but indicate the importance of completely cleaning the longitudinal passages through the fuel elements. As pitch residue and other foreign material is removed from the fuel element surfaces surrounding the longitudinal passages, it tends to fall into the hollow support structure 80 from where it is transferred to the pneumatic collection system 52.

An additional rotating brush 94 is also mounted on one side of Station C and includes a surrounding hood 96 which is similarly connected with the pneumatic collection system 52. During cleaning of the longitudinal passages through the fuel element by one of the cleaning heads 38, 40 or 42, the fuel element is periodically rotated by approximately 60° with the rotating brush 94 being moved along each of the six lateral surfaces 98 for the fuel element. In this manner, all of the lateral surfaces of the fuel element are cleaned at the same time that its internal longitudinal passages are being cleaned by one of the cleaning heads.

After the longitudinal passages and lateral surfaces of the fuel element are cleaned, the fuel element is again picked up by the crane unit 24 and is deposited at one of the alternate Station portions D1 or D2 depending upon information received by the control unit 34 from the probes in Station B. With the fuel element positioned upon one of the alternate Station portions, for example that indicated at D1, the manifold 44 is engaged with the upper end surface 22 of the fuel element. At the same time, the lower end surface 30 of the fuel element is positioned upon a support block 100 at the alternate Station D1. A similar support block is provided at 102 for the Station D2.

Figure 5:
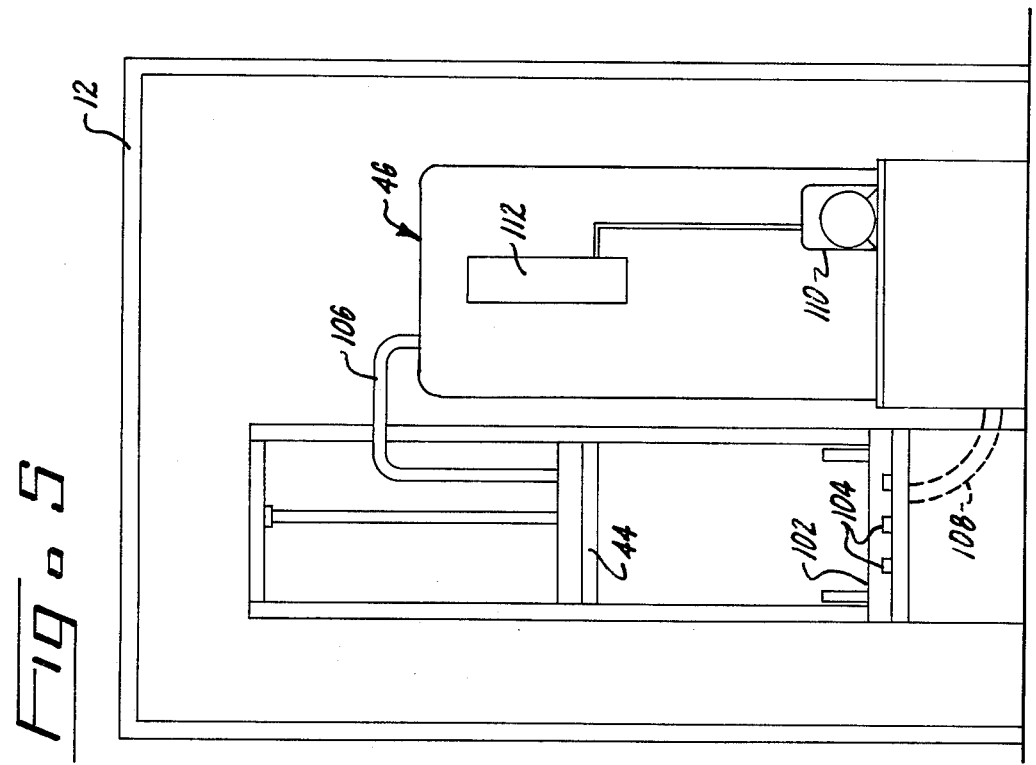
FIG. 5 is a view taken along section lines V—V of FIG. 3 in order to more clearly illustrate gauging apparatus for monitoring flow resistance through longitudinal gas coolant passages in the fuel elements.

The manifold 44 and support block 100 are formed with annular seal rings 104 for pneumatically communicating selected respective longitudinal coolant gas flow passages in the fuel element with inlet and outlet conduits 106 and 108 which are interconnected with the gauging unit 46 of FIG. 5. Referring momentarily to FIG. 5, it may be seen that one or more pumps 110 are employed to direct the gas flow under pressure through the inlet conduit 106 to the selected longitudinal coolant gas flow passages in the fuel element. At the same time, the outlet conduits 108 are connected with gas pressure monitoring means such as a flow manometer 112 in order to closely determine the resistance provided by selected longitudinal coolant gas flow passages in the fuel element. The gas flow resistance for each selected longitudinal passage may of course be determined by the corresponding pressure drop.

The effective performance of the cleaning system 10 is determined by this flow resistance measurement for the longitudinal passages which is of course dependent upon the removal of pitch residue and other foreign debris from the internal surfaces of the fuel element about the longitudinal passages. Those longitudinal passages acutally monitored by the gauging unit 46 are selected to assure monitoring of longitudinal passages cleaned by the various cleaning elements in any of the cleaning heads 38, 40 and 42. In this manner, the system more accurately assures effective cleaning within each of the fuel elements.

If the fuel element is found to be satisfactorily cleaned, it is then transferred to and deposited upon the outlet cart 48 at the operating position indicated as Station E. The outlet cart 48 is operated by the control unit 34 in conjunction with the exit air-lock 50 in order to remove the cleaned fuel element from the system enclosure 12.

In order to increase the cleaning capacity for the system 10, it is particularly contemplated that a separate fuel element 14 be in place upon each of the operating locations indicated at Stations A–E. If a particular fuel element is found to be unsatisfactorily cleaned while it is upon either of the alternate Station portions D1 or D2, the crane unit 24 is programmed by the control unit 34 to return the improperly cleaned fuel element to Station C for recleaning by the proper cleaning head 38, 40 or 42. The fuel element is then again returned to one of the alternate Station portions D1 or D2 and subjected to the pressure monitoring operation described above.

The pneumatic collection system 52 includes a cyclone type separator 114 which classifies pitch residue and other foreign material according to particle size for collection in one of three collection chambers 116, 118 and 120. At the same time, a vacuum is produced in all of the conduits such as that indicated at 74 for collecting the foreign material from the various stations. In this manner, the foreign material is collected and classified in the various chambers 116–120 for subsequent removal from the system as required.

Operation of the entire cleaning system 10 is preferably automatic during normal operation under regulation of the control unit 34. The control unit 34 may be of a conventional programmed type having necessary peripheral components for automatically switching on and off all the fuel element cleaning and handling operations described above. Preferably, the control unit 34 is adapted in generally conventional fashion for switching into a manual mode of operation where all of the cleaning and handling functions discussed above may be selectively stepped through or performed under manual control.

The control unit 34 also of course includes conventional accessory equipment such as is necessary for example to detect and identify various malfunctions within the cleaning system and to indicate such malfunctions for example by suitable alarm means. Otherwise, the control unit 34 which operates the various components at the operations Stations A-E functions in a conventional manner so that no further description is believed necessary.

Accordingly, a method and apparatus for cleaning fuel elements has been described above which is believed to provide numerous operating advantages. For example, the cleaning system is particularly compact and completely contained within the fabricated enclosure 12 which maintains a negative internal pressure to prevent pollution of the environment outside the enclosure. The system may be run remotely and automatically by a programmable control unit such as that indicated at 34. The system may also be run manually if deemed necessary. Further, the system is designed to automatically clean all external and internal surfaces of the fuel element and to thus restore its original surface characteristics. The system is also readily adaptable to fuel elements having different configurations, particularly different arrangements of longitudinal passages extending through the elements. The system automatically inspects the fuel elements to determine if they are satisfactorily cleaned with provision being made to recycle any unsatisfactory fuel elements. Numerous additional advantages for the system will also be apparent from the preceding description.

Numerous variations and modifications for the method and apparatus described above are believed apparent. Accordingly, the scope of the present invention is defined only by the following appended claims.

What is claimed is:

1. Apparatus for cleaning carbonized pitch residue from surfaces of nuclear fuel elements following in-block, high temperature curing of the nuclear fuel containing pitch, the fuel element having opposed end surfaces with a plurality of lateral surfaces therebetween and one or more longitudinal passages extending through the fuel element between its end surfaces, comprising an enclosure for preventing escape of pitch residue from the surfaces of the fuel element into the environment during cleaning, air-lock means for introducing the fuel element into the enclosure, means for moving the fuel element between a plurality of stations within the enclosure, the stations including means for cleaning one end surface of the fuel element, means for cleaning the other end surface of the fuel element, probe means engageable with one end of the fuel element for determining the presence of certain longitudinal passages therein, means responsive to the probe means for aligning cleaning elements with respective longitudinal passages in the fuel element, the cleaning elements being extendable through the longitudinal passages in order to engage and clean the surrounding surfaces of the fuel element along the length of the passages, means for cleaning the lateral surfaces of the fuel element, and air-lock means for permitting exit of the fuel element from the enclosure after cleaning.

2. The apparatus of claim 1 wherein means for cleaning the lateral surfaces of the fuel element comprise brush means movable along a selected lateral surface of a fuel element and further comprising means for rotating the fuel element relative to the brush means for arranging the brush means in cleaning alignment with respective lateral surfaces of the fuel element.

3. The apparatus of claim 1 wherein the fuel element is of a gas cooled type with one or more of the longitudinal passages being adapted to communicate gas coolant flow through the fuel element and further comprising gauge means for determining resistance of the longitudinal gas coolant passage to the flow of gas coolant therethrough after cleaning.

4. The apparatus of claim 3 further comprising programmable control means for regulating operation of the cleaning apparatus, probe means and gauge means within the enclosure, the gauge means including means for positioning the fuel element to have its longitudinal passages recleaned in the event of gas coolant flow resistance beyound a preselected level.

5. Apparatus for cleaning nuclear fuel elements of a type having opposed end surfaces and a plurality of lateral surfaces therebetween, a plurality of longitudinal passages extending through the fuel element between the end surfaces, comprising means for cleaning the end surfaces of the fuel element, means for cleaning the plurality of lateral surfaces of the fuel element, probe means being movable into engagement with one end of the fuel element for determining the configuration of the longitudinal passages, means for cleaning the longitudinal passages in the fuel element, the cleaning means for the longitudinal passages comprising at least one cleaning element extendable through a respective longitudinal passage in the fuel element in order to engage and clean the surrounding surfaces of the fuel element along the length of the passage, the cleaning means for the longitudinal passages being responsive to the probe means for aligning the cleaning element with the respective longitudinal passage, gauging means for determining if the fuel element is satisfactorily cleaned, programmed control means for regulating operation of the plural cleaning means, the probe means and the gauging means, and an enclosure for containing the plural cleaning means.

6. The apparatus of claim 5 wherein the fuel element is of a gas cooled type with the respective longitudinal passage being a gas flow passage, the gauging means determining the resistance of the longitudinal passage to gas flow therethrough after the longitudinal passage is cleaned by the cleaning element.

7. The apparatus of claim 6 wherein the cleaning means is responsive to the gauging means for recleaning the respective longitudinal passage if its resistance to gas flow exceeds a predetermined level.

8. The apparatus of claim 5 wherein the cleaning element comprises a rotating brush.

9. A method for cleaning the surfaces of nuclear fuel elements having opposed end surfaces, a plurality of lateral surfaces therebetween and one or more longitudinal passages extending through the fuel element between the end surfaces, the steps comprising cleaning one end surface of the fuel element, cleaning the other end surface of the fuel element, sensing the configuration of one or more longitudinal passages in the fuel element, aligning a cleaning element with a respective longitudinal passage in the fuel element, causing the cleaning element to extend through the longitudinal passage in order to engage and clean the fuel element surfaces forming the longitudinal passage along the entire length of the passage, gauging selected surfaces of the fuel element in order to determine if it is satisfactorily cleaned, and performing said cleaning steps within an enclosure, for containing foreign material cleaned from the fuel element surfaces.

10. The method of claim 9 further comprising the step of forming an enclosure containing a number of stations where the respective steps are carried out and providing means for moving the fuel element between the various stations.

11. The method of claim 10 comprising the additional steps of forming air-locks for respectively permitting entrance of each fuel element into the enclosure and permitting exit of each element therefrom.

12. The method of claim 9 wherein the fuel element may be one of a variety having different configurations of longitudinal passages and further comprising the steps of providing alternate cleaning head each having one or more cleaning elements arranged for alignment with the respective longitudinal passages in the various fuel elements and aligning one of the alternate cleaning heads with the fuel element in accordance with the sensed configuration of the longitudinal passages for the respective fuel element.

13. The method of claim 12 wherein the cleaning elements comprise rotatable brushes mounted for extension through the longitudinal passages in the respective fuel elements.

* * * * *

UNITED STATES PATENT AND TRADEMARK OFFICE
CERTIFICATE OF CORRECTION

PATENT NO. : 4,063,962
DATED : December 20, 1977
INVENTOR(S) : Arya and Godsin

It is certified that error appears in the above-identified patent and that said Letters Patent are hereby corrected as shown below:

Col. 1, line 50:  "a" should read --an--.

Col. 6, line 66:  "had" should read --and--.

Col. 9, line 61:  "beyound" should read --beyond--.

Signed and Sealed this

Fourth Day of July 1978

[SEAL]

Attest:

RUTH C. MASON
Attesting Officer

DONALD W. BANNER
Commissioner of Patents and Trademarks